(12) United States Patent
Keltgen et al.

(10) Patent No.: US 11,365,994 B2
(45) Date of Patent: Jun. 21, 2022

(54) MAGNETIC FLOWMETER FLOW TUBE ASSEMBLY LINER

(71) Applicant: Micro Motion, Inc., Boulder, CO (US)

(72) Inventors: Paul Michael Keltgen, Waconia, MN (US); Brian Scott Junk, Plymouth, MN (US); Michael Jeffrey Mikolichek, Farmington, MN (US)

(73) Assignee: MICRO MOTION, INC., Boulder, CO (US)

( * ) Notice: Subject to any disclaimer, the term of this patent is extended or adjusted under 35 U.S.C. 154(b) by 46 days.

(21) Appl. No.: 16/906,219

(22) Filed: Jun. 19, 2020

(65) Prior Publication Data

US 2021/0396555 A1    Dec. 23, 2021

(51) Int. Cl.
*G01F 1/58*    (2006.01)

(52) U.S. Cl.
CPC .............. *G01F 1/584* (2013.01); *G01F 1/586* (2013.01)

(58) Field of Classification Search
CPC ................................. G01F 1/584; G01F 1/586
See application file for complete search history.

(56) References Cited

U.S. PATENT DOCUMENTS

| | | |
|---|---|---|
| 3,347,568 A | 10/1967 | Weeden, Jr. et al. |
| 3,695,104 A | 10/1972 | Mannherz et al. |
| 3,750,468 A * | 8/1973 | Grauer .................... G01F 1/588 73/861.12 |
| 4,206,640 A | 6/1980 | Suzuki |
| 6,330,831 B1 | 12/2001 | Lynnworth et al. |
| 6,539,981 B1 | 4/2003 | Kleven et al. |
| 7,637,169 B2 | 12/2009 | Shanahan et al. |
| 7,823,461 B2 * | 11/2010 | Kappertz ................ G01F 15/18 73/861.12 |
| 9,027,418 B2 | 5/2015 | Smith et al. |
| 9,127,974 B2 | 9/2015 | Rogers et al. |
| 9,316,514 B2 | 4/2016 | Smith et al. |
| 9,464,926 B2 | 10/2016 | Smith et al. |
| 9,488,511 B2 | 11/2016 | Barto |
| 2005/0210997 A1 | 9/2005 | Lincoln et al. |
| 2008/0196510 A1 | 8/2008 | Nielsen |
| 2010/0317789 A1 | 12/2010 | Greene |
| 2013/0305838 A1 | 11/2013 | Mikolichek et al. |
| 2013/0319133 A1 | 12/2013 | Lubbers |

(Continued)

FOREIGN PATENT DOCUMENTS

DE    102014114289 A1    4/2016
EP       0581017 A1    2/1994
(Continued)

OTHER PUBLICATIONS

Office Action from Chinese Patent Application No. 202022112780.2, dated Dec. 7, 2020.
(Continued)

*Primary Examiner* — Peter J Macchiarolo
*Assistant Examiner* — John M Royston
(74) *Attorney, Agent, or Firm* — Westman, Champlin & Koehler, P.A.

(57) ABSTRACT

A flow tube liner for a flow tube assembly of a magnetic flowmeter includes a cylindrical wall. The cylindrical wall includes an electrically insulative interior layer and a metallic exterior layer. The exterior layer is bonded to an exterior surface of the interior layer.

20 Claims, 5 Drawing Sheets

(56) References Cited

U.S. PATENT DOCUMENTS

| | | |
|---|---|---|
| 2014/0000382 A1 | 1/2014 | Iijima |
| 2014/0053908 A1* | 2/2014 | Smillie ................ B32B 15/082 |
| | | 137/1 |
| 2014/0083199 A1 | 3/2014 | Rogers |
| 2014/0090483 A1 | 4/2014 | Smith et al. |
| 2016/0348812 A1 | 12/2016 | Hairston |

FOREIGN PATENT DOCUMENTS

| | | |
|---|---|---|
| EP | 0852703 A1 | 7/1998 |
| WO | 9712209 A1 | 4/1997 |
| WO | 2010094293 A1 | 8/2010 |

OTHER PUBLICATIONS

International Search Report and Written Opinion of the International Searching Authority from International Application No. PCT/US2021/022580, dated Jun. 28, 2021.
International Search Report and Written Opinion of the International Searching Authority from International Application No. PCT/US2021/027497, dated Jul. 12, 2021.
Scheirs J., "Fluoropolymers—Technology, Markets and Trends", A Rapra Industry Analysis Report, Rapra Review Reports, United Kingdom, Apr. 1, 2001 (Apr. 1, 2001), pp. 1-50, XP003032133.
Office Action from U.S. Appl. No. 17/024,079, dated Oct. 18, 2021.

\* cited by examiner

MAGNETIC FLOWMETER FLOW TUBE ASSEMBLY LINER

FIELD

Embodiments of the present disclosure relate to magnetic flowmeters and, more specifically, to flow tube liners for use with magnetic flowmeters.

BACKGROUND

Precise and accurate flow control is critical to a wide range of fluid processing applications, including bulk fluid handling, food and beverage preparation, chemistry and pharmaceuticals, water and air distribution, hydrocarbon extraction and processing, environmental control, and a range of manufacturing techniques utilizing thermoplastics, thin films, glues, resins and other fluid materials, for example. Flow rate measurement technologies used in each particular application depend upon the fluids involved, and on the relevant process pressures, temperatures and flow rates.

Exemplary flow rate measuring technologies include turbine devices that measure flow as a function of mechanical rotation, pitot sensors and differential pressure devices that measure flow as a function of the Bernoulli effect or pressure drop across a flow restriction, vortex and Coriolis devices that measure flow as a function of vibrational effects, and mass flowmeters that measure flow as a function of thermal conductivity. Magnetic flowmeters are distinguished from these technologies by characterizing a flow based on Faraday's Law, which depends upon electromagnetic interactions rather than mechanical or thermodynamic effects. In particular, magnetic flowmeters rely upon the conductivity of the process fluid, and the electromotive force (EMF) induced as the fluid flows through a region of magnetic field.

Conventional magnetic flowmeters include a sensor section, a transmitter section and a flow tube assembly. The flow of fluid to be measured travels through a pipe section of the flow tube assembly. A pair of electrodes are positioned to contact the flow. The electrodes extend through a non-conductive polymer liner that electrically insulates the fluid from the pipe section, and prevents the fluid from forming a short circuit between the electrodes and the pipe section.

The transmitter section includes a current generator that drives a current through a coil of the sensor section to generate a magnetic field across the pipe section and the flow. The magnetic field induces the EMF or potential difference (voltage) across the flow that is proportional to the velocity of the flow. The magnetic flowmeter measures the voltage difference using the electrodes, and determines the flow rate of the flow based on the measured voltage difference.

Over time, the fluid may permeate through the liner and cause a short circuit between the electrodes and the pipe section. Such a short circuit renders the magnetic flowmeter inoperable.

Additionally, a vacuum event may occur, in which a vacuum is formed within the interior of the pipe section and liner. Such vacuum events can cause the liner to pull away from the interior wall of the pipe section. This may cause permanent deformation of the liner and a loss of seal between the flow of fluid and the pipe section. Accordingly, such an event can also render the magnetic flowmeter inoperable.

Permeation of process fluid entrained gases can occur creating a pressurized volume between the pipe section and liner. During a depressurization event this pressurized volume will expand causing permanent deformation of the liner. Such an event will also render the magnetic flowmeter inoperable.

SUMMARY

Embodiments of the present disclosure are directed to a flow tube liner for a flow tube assembly of a magnetic flowmeter, a flow tube assembly that includes the flow tube liner, and a method. One embodiment of the flow tube liner includes a cylindrical wall having an electrically insulative interior layer and a metallic exterior layer bonded to an exterior surface of the interior layer.

One embodiment of the flow tube assembly includes a pipe section, a coil, and a flow tube liner. The coil is configured to receive a coil current and produce a magnetic field across the pipe section that induces an electromotive force (EMF) in a fluid flow traveling through an interior of the pipe section. The flow tube liner includes a cylindrical wall, which is received within the interior of the pipe section, and includes an electrically insulative interior layer, and a metallic exterior layer bonded to an exterior surface of the interior layer.

In one embodiment of the method, a pipe section, a coil and a flow tube liner are provided, and the flow tube liner is inserted within the pipe section. The coil is configured to receive a coil current and produce a magnetic field across the pipe section that induces an electromotive force (EMF) in a fluid flow traveling through an interior of the pipe section. The flow tube liner includes a cylindrical wall having an electrically insulative interior layer and a metallic exterior layer bonded to an exterior surface of the interior layer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form, in order to avoid obscuring the embodiments in unnecessary detail.

Figure 1:
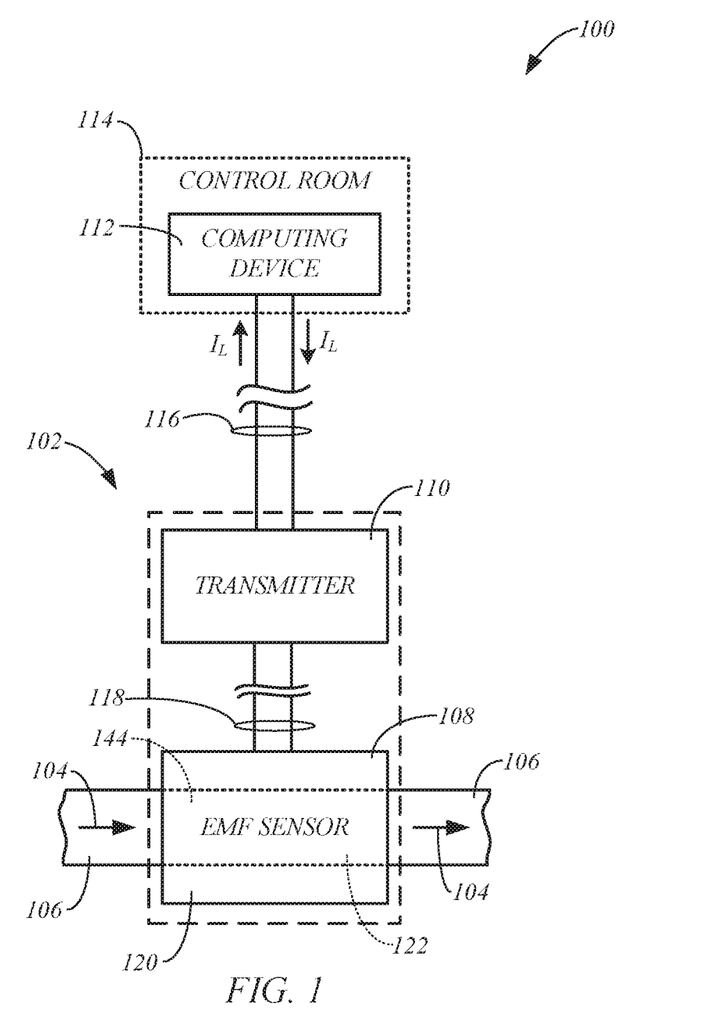
FIG. 1 is a simplified diagram of an example of an industrial process measurement system, in accordance with embodiments of the present disclosure.

FIG. 1 is a simplified diagram of an exemplary industrial process measurement system 100, in accordance with embodiments of the present disclosure. The system 100 may be used in the processing of a material (e.g., process medium) to transform the material from a less valuable state into more valuable and useful products, such as medicine, chemicals, paper, food, etc. For example, the system 100 may be used in an oil refinery that performs industrial processes that can process crude oil into gasoline, fuel oil, and other petrochemicals.

The system 100 includes a magnetic flowmeter 102 that is configured to sense a flow rate of a process fluid flow 104, such as through pipe sections 106, for example. The magnetic flowmeter 102 includes a sensor section 108 and a transmitter 110. The sensor section 108 is generally configured to measure or sense the flow rate of the fluid flow 104. The transmitter 110 is generally configured to control the sensor section 108 to measure the flow rate, and optionally communicate the measured flow rate to an external computing device 112, such as a computerized control unit, which may be remotely located from the flowmeter 102, such as in a control room 114 of the system 100.

The transmitter 110 may communicate with the external computing device 112 over a suitable process control loop. In some embodiments, the process control loop includes a physical communication link, such as a two-wire control loop 116, or a wireless communication link. Communications between the external computing device 112 and the transmitter section may be performed over the control loop 116 in accordance with conventional analog and/or digital communication protocols. In some embodiments, the two-wire control loop 116 includes a 4-20 milliamp control loop, in which a process variable may be represented by a level of a loop current $I_L$ flowing through the two-wire control loop 116. Exemplary digital communication protocols include the modulation of digital signals onto the analog current level of the two-wire control loop 116, such as in accordance with the HART® communication standard. Other purely digital techniques may also be employed including Foundation Fieldbus, Profibus, and Modbus communication protocols. Exemplary wireless versions of the process control loop include, for example, a wireless mesh network protocol, such as WirelessHART® (IEC 62591) or ISA 100.11a (IEC 62734), or another wireless communication protocol, such as WiFi, LoRa, Sigfox, BLE, or any other suitable protocol.

Power may be supplied to the magnetic flowmeter 102 from any suitable power source, such as AC or DC power sources. For example, the magnetic flowmeter 102 may be wholly powered by the loop current $I_L$ flowing through the control loop 116. One or more power supplies may also be utilized to power the process magnetic flowmeter 102, such as an internal or an external battery. An electrical power generator (e.g., solar panel, a wind power generator, etc.) may also be used to power the magnetic flowmeter 102, or charge a power supply used by the magnetic flowmeter 102.

The transmitter 110 may be directly attached to the sensor section 108, such as a housing containing the sensor section 108, or located remotely (e.g., 10-1000 feet) from the sensor section 108. When the transmitter 110 is remotely located from the sensor section 108, electrical connections between the transmitter 110 and sensor section 108 may be provided by one or more connecting cables or transmission lines 118, which may be formed by cables, wires, a data bus, a control bus, or other suitable connection for electrical and data communication.

Figure 2:
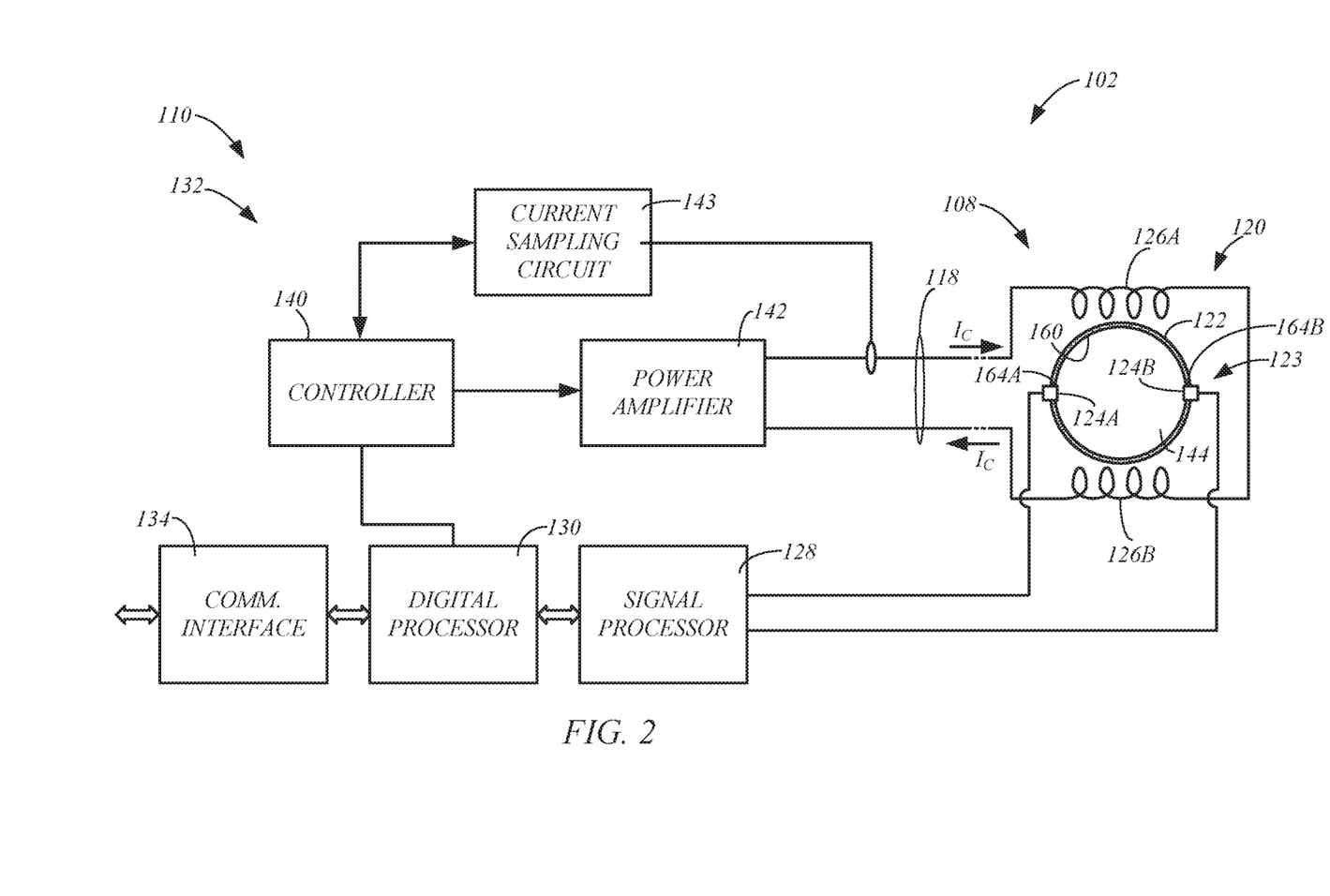
FIG. 2 is a schematic diagram of an example of a magnetic flowmeter, in accordance with embodiments of the present disclosure.

FIG. 2 is a simplified diagram of the magnetic flowmeter 102, in accordance with embodiments of the present disclosure. The sensor section 108 may include a flow tube assembly 120 having a pipe section 122, through which the fluid flow 104 travels. The flow tube assembly 120 also includes an EMF sensor 123 having electrodes 124, such as electrodes 124A and 124B, and the flow tube assembly 120 includes one or more field coils or coil wires 126, such as coils 126A and/or 126B. The electrodes 124A and 124B, and the coils 126A and 126B may each be positioned on opposing sides of the pipe section 122 from each other, as shown in FIG. 2.

The digital processor 130 may represent one or more processors that control components of the magnetic flowmeter 102 to perform one or more functions described herein in response to the execution of instructions, which may be stored in non-transitory, patent eligible memory. In some embodiments, the digital processor 130 provides control signals to the current generator 132 based on an operating setpoint of the magnetic flowmeter 102, to generate a coil current $I_C$ comprising, for example, DC current pulses (e.g., square wave current pulses) that alternate direction through the coils 126. Other types of alternating coil currents may also be used.

In some embodiments, the current generator 132 includes a controller 140 and a power amplifier 142. The controller 140 may represent one or more processors that control components of the power amplifier 142 to perform one or more functions described herein, such as in response to control signals from the digital processor 130, and/or in response to the execution of instructions, which may be stored in non-transitory, patent eligible memory represented by the controller 140.

The controller 140 controls the power amplifier 142 to generate a coil current $I_C$ based on a setpoint level for the magnetic flowmeter 102. The controller 140 may periodically receive current level measurements of the coil current $I_C$ from a current sampling circuit 143 as feedback to determine if an adjustment to the coil current $I_C$ is required to match the setpoint level for the magnetic flowmeter 102, which is necessary for accurate flow rate measurements. The current sampling circuit 143 may take on any suitable form. For example, the current sampling circuit 143 may operate to sense a voltage that is related to the coil current $I_C$, such as at the location shown in FIG. 2, and convert the sampled voltage to a digital signal using an analog-to-digital converter that is presented to the controller 140 as a measured current level, for example. The controller 140 may adjust the coil current $I_C$ based on the measured current level in an attempt to match the current level of the coil current $I_C$ to the setpoint current level directed by the operating setpoint of the magnetic flowmeter 102.

The coil current $I_C$ is delivered to the field coils 126A and/or 126B of the flow tube 120 through a suitable electrical connection, such as the transmission line 118 shown in FIGS. 1 and 2. This causes the coils 126A and/or 126B to generate a magnetic field across the pipe section 122 that changes direction at a desired excitation frequency. The process fluid flow 104 traveling through the interior 144 of pipe section 122 functions as a moving conductor that induces EMF in the fluid in accordance with Faraday's law of electromagnetic induction. The electrodes 124A and 124B, which may include electrode components that provide a capacitive coupling to the conductive process fluid or a direct electrical coupling to the conductive process fluid, pick up the voltages present in the fluid flow 104. The difference in the voltages at the electrodes 124A and 124B is proportional to the rate of the fluid flow 104.

The signal processor 128 of the transmitter 110 is connected to the electrodes 124A and 124B. The flow tube assembly 120 may be electrically grounded to the pipe section 122, to a flange or pipe section upstream or downstream of the pipe section 122, or to another suitable ground connection. The digital processor 130 controls the signal processor 128 to sample the voltage difference between the electrodes 124A and 124B, and provide the measured voltage difference to the digital processor 130, using any suitable technique. This may involve converting an analog differential voltage signal to a digital value that is supplied to the digital processor 130, for example. The digital processor 130 may perform further signal processing of measured differential voltage to establish a flow rate measurement of the flow rate of the process fluid flow 104. The measured flow rate may be communicated to the computing device 112 using the communications interface 134, such as through one of the wired or wireless communication protocols discussed above.

Figure 3:
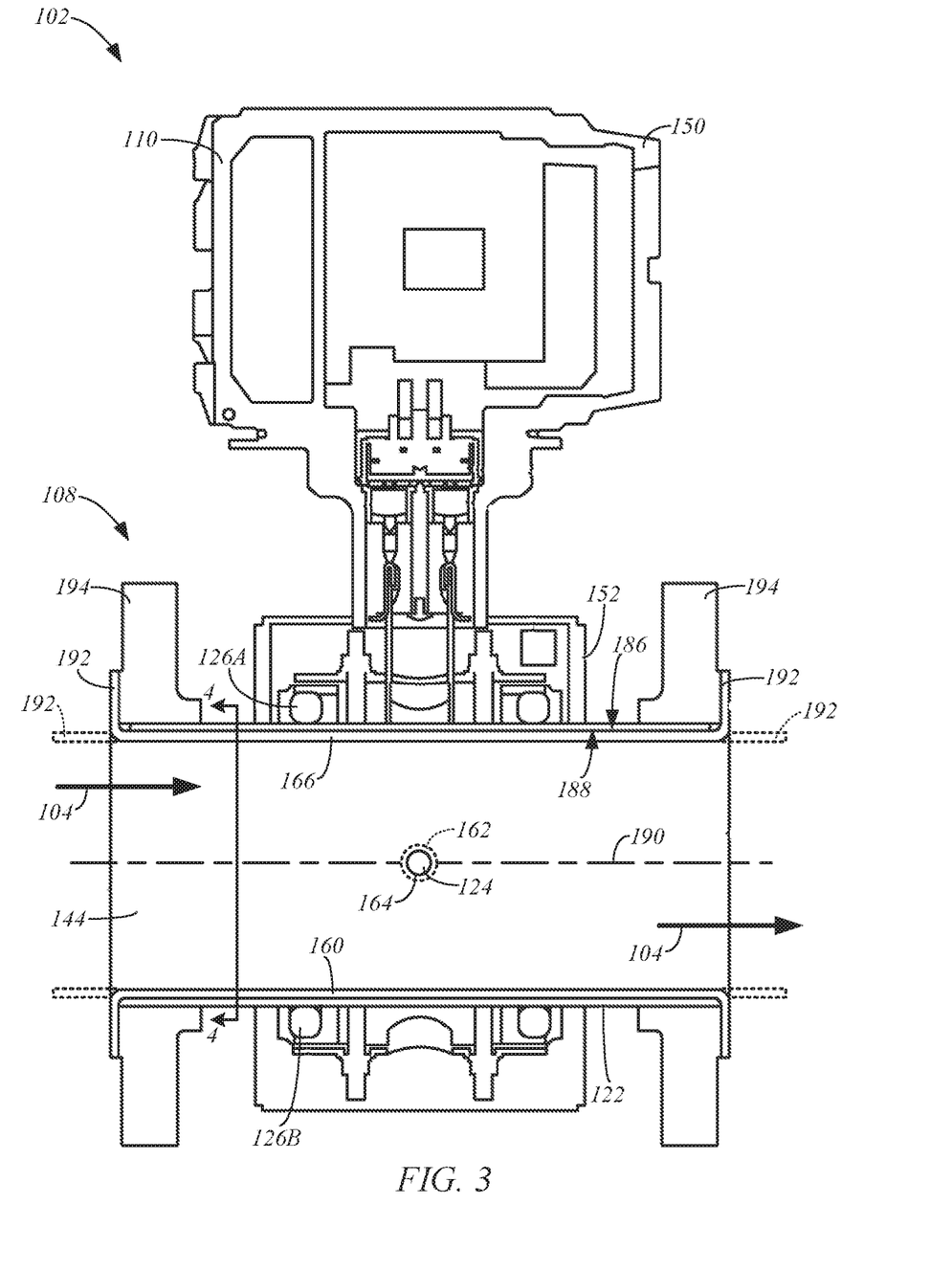
FIG. 3 is a simplified cross-sectional view of an example of a magnetic flowmeter, in accordance with embodiments of the present disclosure.

FIG. 3 is a simplified cross-sectional view of an example of magnetic flowmeter 102, in accordance with embodiments of the present disclosure. In some embodiments, the magnetic flowmeter 102 includes a transmitter housing 150, which may contain circuitry forming the signal processor 128, the digital processor 130, the communications interface 134, the controller 140, the power amplifier 142, and/or other components. A magnetics compartment 152 may surround the pipe section 122 of the flow tube assembly 120 and contain one or more field coils 126, the electrodes 124, and/or other components. As mentioned above, the field coils 126 may be located opposite each other on the outside of the pipe section 122 (e.g., above and below the pipe section 122).

A flow tube liner 160 of the flow tube assembly 120, formed in accordance with one or more embodiments described herein, seals the pipe section 122 from the interior 144, through which the fluid flow 104 travels. The electrodes 124 may extend through tunnels 162 of the pipe section 122 while being electrically insulated from the pipe section 122. The electrodes may also extend through apertures 164 of the liner 160, and into the interior 144 to contact the fluid flow 104. The apertures 164 may be located on opposing sides of the liner 160, such as indicated by apertures 164A and 164B in FIG. 2. The liner 160 may include additional apertures 164 as necessary to accommodate additional electrodes 124, such as a reference electrode, for example. The liner 160 provides a seal with the electrodes 124 at the apertures 164 to prevent fluid penetration to the pipe section 122.

Embodiments of the flow tube liner 160 provide improved protection from permeation of the process fluid to the pipe section 122 over conventional flow tube liners, thus providing improved protection from a short circuit between the fluid flow 104, the pipe section 122 and electrodes 124A or 124B, which would render the magnetic flowmeter 102 inoperable. Additionally, embodiments of flow tube liner 160 provide improved protection from the collapse of the liner 160 due to the formation of a vacuum within the interior 144 of the pipe section 122 over conventional flow tube liners.

Figure 4:
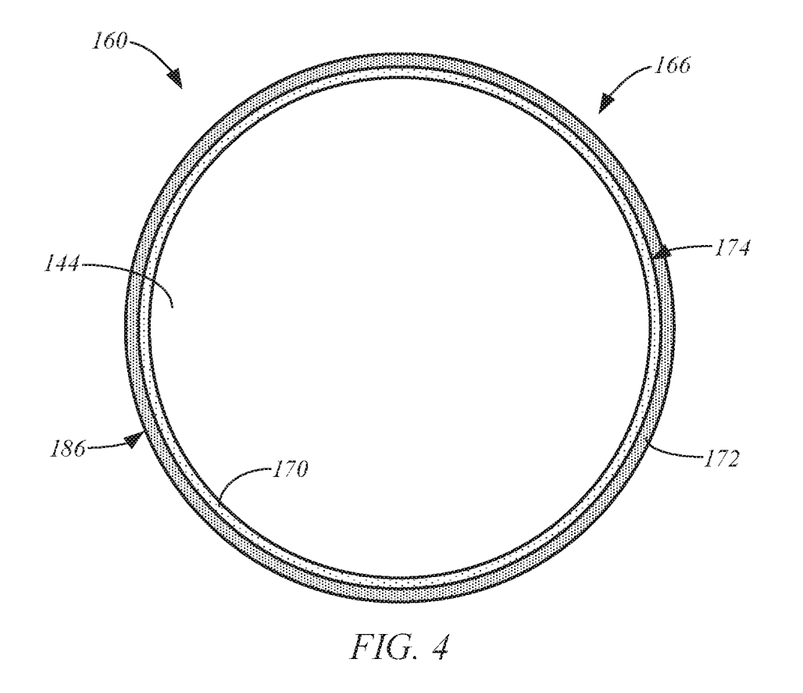
FIGS. 4 and 5 respectively are a simplified cross-sectional view of a flow tube liner of FIG. 3 taken along line 4-4, and a simplified side cross-sectional view of a portion of the flow tube assembly of FIG. 3, in accordance with embodiments of the present disclosure.
Figure 5:
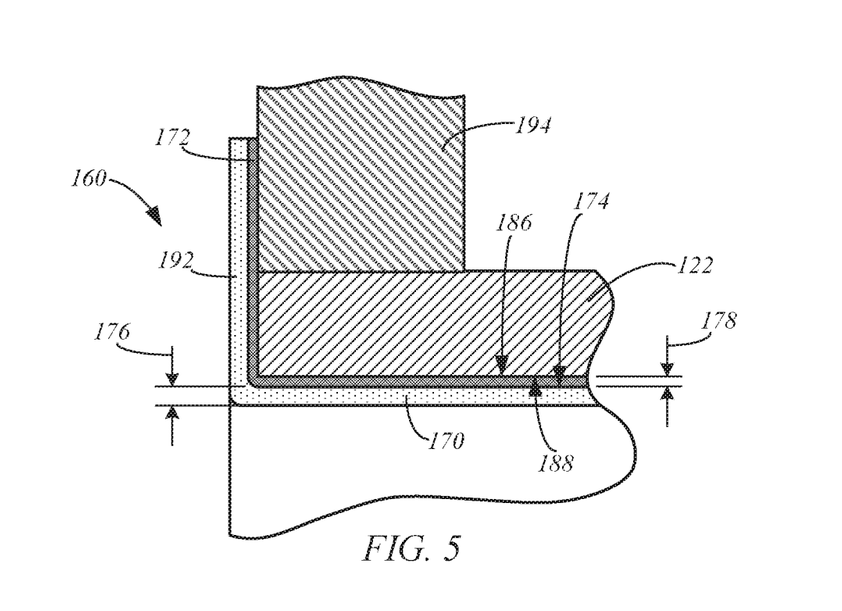

FIGS. 4 and 5 respectively are a cross-sectional view of the flow tube liner 160 of FIG. 3 taken along line 4-4, and a side cross-sectional view of a portion of the liner 160 of FIG. 3, in accordance with embodiments of the present disclosure. The illustrated features are not shown to scale.

In some embodiments, the flow tube liner 160 includes a multi-layered cylindrical wall 166. The wall includes an electrically non-conductive or insulative interior layer 170 and a metallic exterior layer 172. The electrically insulative interior layer generally encircles an interior corresponding to the interior 144 of the pipe section, as indicated in FIG. 4, and engages the fluid flow 104, while the metallic exterior layer is bonded to an exterior surface 174 of the interior layer 170. The exterior layer 172 may be directly bonded to an exterior surface 174 of the interior layer 170, or the exterior layer 172 may be bonded to the exterior surface 174 of the interior layer 170 through one or more intermediate layers (not shown). In some embodiments, the metallic exterior layer is electrically conductive.

In one embodiment, the interior layer 170 comprises a polymer. The polymer may form a substantial entirety (e.g., greater than 90% by volume or weight) of the interior layer 170. Examples of the polymer include fluoropolymer, perfluoroalkoxy alkane (PFA), polytetrafluoroethylene (PTFE), ethylene tetrafluoroethylene (ETFE), polyether ether ketone (PEEK), polycarbonate, polyethylene terephthalate (PET), acrylonitrile butadiene styrene (ABS), polycarbonate/acrylonitrile butadiene styrene (PC/ABS), polyetherimide (PEI), acrylic, nylon, crosslinked polyethylene (PEX) and polyoxymethylene (POM). In one embodiment, the interior layer 170 does not include a high crystallinity fluoropolymer.

In one embodiment, the exterior layer 172 comprises a metal. The metal may form a substantial entirety (e.g., greater than 90% by volume or weight) of the exterior layer 172. Examples of the metal include aluminum, stainless steel, gold, copper, titanium, chromium, tantalum, vanadium, nickel and metallic oxides.

In some embodiments, the exterior layer 172 may be formed on the interior layer 170 through any suitable means. For example, the exterior layer 172 may be formed on the interior layer 170 through a vacuum deposition process, arc or flame spraying, electroless plating, electroplating, or another suitable process. Thus, the bond between the interior and exterior layers may include mechanical and/or chemical bonds.

The exterior layer 172 operates as a barrier to liquid and vapor permeation through the interior layer 170. Thus, unlike conventional flow tube liners that must use relatively thick cylindrical walls (e.g., up to 0.5 inches thick) to reduce liquid and vapor permeation, the flow tube liner 160 may utilize a relatively thin polymer layer to form the interior layer 170 and a thin exterior layer 172, while reducing or eliminating liquid and vapor permeation through the liner 160. For example, a thickness 176 (FIG. 5) of the interior layer 170 may be about 0.2 inches, while a thickness 178 of the exterior layer 172 may be about 30 Å-500 Å, resulting in a total thickness of the wall 166 of about 0.2 inches.

Each of the apertures 164 of the liner 160 extend through the layers 170 and 172. Each of the electrodes 124 is insulated from the exterior layer 172 either by a housing of the electrode 124, or by an insulating sleeve surrounding the electrode 124 that is received within the aperture 164.

Figure 6:
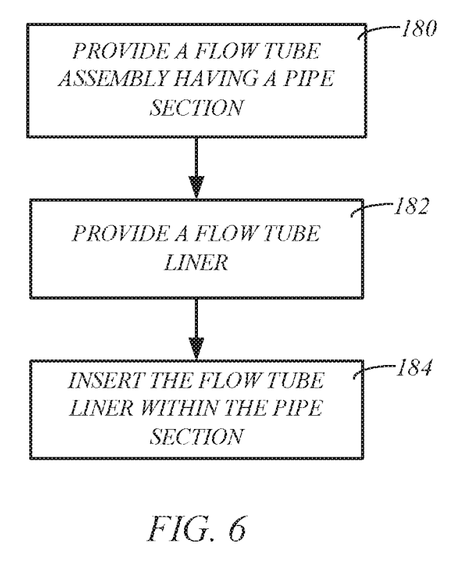
FIG. 6 is a flowchart of a method, in accordance with embodiments of the present disclosure.

Additional embodiments are directed to a flow tube assembly 120 or a magnetic flowmeter 102 that includes the flow tube liner 160 formed in accordance with one or more embodiments described herein, such as shown in FIG. 3, and a method. FIG. 6 is a flowchart of the method in accordance with embodiments of the present disclosure.

At 180 of the method, a flow tube assembly 120 is provided. In one example, the flow tube assembly 120 includes a pipe section 122, and one or more coils 126 configured to receive a coil current $I_C$ and produce a magnetic field across the pipe section 122 that induces an EMF in a fluid flow 104 traveling through the pipe section 122, such as indicated in FIGS. 2 and 3, for example.

At 182 of the method, a flow tube liner 160 formed in accordance with one or more embodiments described herein is provided. In one embodiment, the flow tube liner 160 includes a cylindrical wall 166 comprising an electrically insulative interior layer 170, and a metallic exterior layer 172. The liner 160 is inserted within the interior 144 of the pipe section 122, at 184. In some embodiments, the exterior diameter of the flow tube liner 160 is matched to the interior diameter of the pipe section 122, such that the liner 160 has an interference fit with the pipe section 122 and generally maintains its position within the pipe section 122 once inserted. In some embodiments, an exterior surface 186 of the flow tube liner 160 is bonded to an interior surface 188 of the pipe section 122.

In one embodiment, the exterior layer 172 is bonded to an exterior surface 174 of the electrically insulative interior layer 170, as shown in FIGS. 4 and 5. Thus, an exterior surface of the exterior layer 172 is bonded to the interior surface of the pipe section 122, such as shown in FIG. 5. Any suitable technique may be used to bond the exterior surface of the exterior layer 172 to the interior surface of the pipe section 122, such as using a suitable adhesive.

In some embodiments, the pipe section 122 includes a central axis 190, as shown in FIG. 3, and the flow tube liner 160 is inserted within the pipe section 122, such that it is substantially concentric with the central axis 190. The flow tube liner 160 may include opposing ends 192 that extend outside the pipe section 122 when the liner 160 is initially inserted into the pipe section 122 (step 184), as indicated in phantom lines in FIG. 3. The ends 192 of the flow tube liner 160 may then be flared using a suitable tube flaring tool, such that the ends 192 extend away from the central axis 190, as shown in FIGS. 3 and 5. The flared ends may be pinched between a flange 194 attached to the pipe section 122 and a flange of pipe sections that adjoin the pipe section 122, from which the fluid flow 104 may be received and discharged by the pipe section 122, such as by pipe sections 106 shown in FIG. 1.

The flow tube liner 160 may include apertures 164 that extend through the layers 170 and 172 and are generally positioned on opposing sides of the liner 160, as discussed above. Additionally, the pipe section 122 may include tunnels 162 that align with the apertures 164. The method may include positioning electrodes 124 such that they each extend through one of the tunnels 162 and one of the apertures 164 and into the interior 144 of the pipe section 122 and the flow tube liner 160, such as indicated in FIG. 2. This exposes the electrodes 124 to the fluid flow 104 for voltage measurements.

In operation, the exterior layer 172 of the flow tube liner 160 operates to provide greater protection from permeation of liquid and vapor from the fluid flow 104 to the pipe section 122 than corresponding conventional polymer flow tube liners. As a result, magnetic flowmeters 102 utilizing flow tube assemblies 120 including the flow tube liner 160 are less likely to be rendered inoperable due to a short circuit caused by liquid or vapor permeation. Furthermore, the flow tube liner 160 can be formed thinner than conventional flow tube liners due to the use of the exterior layer 172 as the liquid and vapor permeation barrier, rather than a thick polymer layer, as in conventional flow tube liners.

Additionally, magnetic flowmeters 102 utilizing flow tube assemblies 120 including the flow tube liner 160 are less likely to be rendered inoperable due to a vacuum collapse of the flow tube liner 160. This is due to the improved structural resilience provided by the metallic exterior layer 172 to the cylindrical wall 166 of the flow tube liner 160, as compared to the single polymer layers of conventional flow tube liners. Additionally, the exterior layer 172 may be bonded to the interior surface 188 of the pipe section 122, further reducing the likelihood of a vacuum collapse.

Furthermore, the flow tube liner 160 has a lower susceptibility to shifting relative to the pipe section 122 during installation of the magnetic flowmeter 102 relative to conventional flow tube liners. Such shifting can cause an electrode 124 to contact the pipe section 122 and short the electrode 124, or introduce a leak at the electrode 124. Either of these conditions would render the magnetic flowmeter 102 inoperable. For example, the more resilient structure of the flow tube liner 160 relative to conventional flow tube liners, allows for a more secure interference fit with the pipe section 122 during installation, and reduces the likelihood of the liner 160 shifting during installation of the magnetic flowmeter 102. Additionally or alternatively, the flow tube liner 160 may be bonded to the pipe section 122, which further reduces the likelihood of the liner 160 shifting during installation of the magnetic flowmeter 102.

Although the embodiments of the present disclosure have been described with reference to preferred embodiments, workers skilled in the art will recognize that changes may be made in form and detail without departing from the spirit and scope of the present disclosure.

What is claimed is:

1. A flow tube liner for a flow tube assembly of a magnetic flowmeter, the flow tube liner comprising a cylindrical wall including:
    an electrically insulative interior layer of a non-metallic material; and
    a metallic exterior layer deposited on and bonded to an exterior surface of the interior layer the metallic layer for use in bonding the flow tube liner to a metal flow tube pipe.

2. The flow tube liner of claim 1, wherein the interior layer comprises a polymer, and the exterior layer comprises a metal or metallic oxide.

3. The flow tube liner of claim 2, wherein the polymer is selected from the group consisting of fluoropolymer, perfluoroalkoxy alkane (PFA), polytetrafluoroethylene (PTFE), ethylene tetrafluoroethylene (ETFE), polyether ether ketone (PEEK), polycarbonate, polyethylene terephthalate (PET), acrylonitrile butadiene styrene (ABS), polycarbonate/acrylonitrile butadiene styrene (PC/ABS), polyetherimide (PEI), acrylic, nylon, crosslinked polyethylene (PEX) and polyoxymethylene (POM).

4. The flow tube liner of claim 3, wherein interior layer does not include a high crystallinity fluoropolymer.

5. The flow tube liner of claim 2, wherein the metal is selected from the group consisting of aluminum, stainless steel, gold, copper, titanium, chromium, tantalum, vanadium, nickel and a metallic oxide.

6. The flow tube liner of claim 2, wherein a first electrode aperture extends through the interior layer and the exterior layer, and a second electrode aperture extends through the interior layer and the exterior layer on an opposing side of the cylindrical wall from the first electrode aperture.

7. A flow tube assembly for use with a magnetic flowmeter to measure a flow rate of a fluid flow comprising:
a metal pipe section;
a coil configured to receive a coil current and produce a magnetic field across the pipe section that induces an electromotive force (EMF) in a fluid flow traveling through an interior of the pipe section; and
a flow tube liner including a cylindrical wall received within the interior of the pipe section, the cylindrical wall comprising:
an electrically insulative interior layer of a non-metallic material; and
a metallic exterior layer deposited on and bonded to an exterior surface of the electrically insulative interior layer, the metallic exterior layer for use in bonding the flow tube liner to the metal pipe section.

8. The flow tube assembly of claim 7, wherein the interior layer comprises a polymer and the exterior layer comprises a metal.

9. The flow tube assembly of claim 8, wherein the polymer is selected from the group consisting of fluoropolymer, perfluoroalkoxy alkane (PFA), polytetrafluoroethylene (PTFE), ethylene tetrafluoroethylene (ETFE), polyether ether ketone (PEEK), polycarbonate, polyethylene terephthalate (PET), acrylonitrile butadiene styrene (ABS), polycarbonate/acrylonitrile butadiene styrene (PC/ABS), polyetherimide (PEI), acrylic, nylon, crosslinked polyethylene (PEX) and polyoxymethylene (POM).

10. The flow tube assembly of claim 9, wherein interior layer does not include a high crystallinity fluoropolymer.

11. The flow tube assembly of claim 8, wherein the metal is selected from the group consisting of aluminum, stainless steel, gold, copper, titanium, chromium, tantalum, vanadium, nickel and a metallic oxide.

12. The flow tube assembly of claim 8, wherein an exterior surface of the exterior layer is bonded to an interior wall of the pipe section.

13. The flow tube assembly of claim 8, wherein:
the pipe section includes central axis; and
the cylindrical wall is substantially concentric with the central axis and includes opposing flared ends positioned outside the pipe section that extend away from the central axis.

14. The flow tube assembly of claim 13, wherein:
a first electrode aperture extends through the interior layer and the exterior layer, and a second electrode aperture extends through the interior layer and the exterior layer on an opposing side of the cylindrical wall from the first electrode aperture; and
the flow tube assembly comprises:
a first electrode located in a first tunnel extending through the first electrode aperture and the pipe section, wherein the first electrode is exposed to the interior of the pipe section; and
a second electrode located in a second tunnel extending through the second electrode aperture and the pipe section, wherein the second electrode is exposed to the interior of the pipe section.

15. A magnetic flowmeter comprising:
the flow tube assembly of claim 14;
a power amplifier configured to generate the coil current;
a signal processor configured to receive voltages sensed by the first and second electrodes and generate a digital voltage signal indicating a voltage difference between the first and second electrodes that is proportional to the EMF and the flow rate of the fluid flow; and
a digital processor configured to process the digital voltage signal and establish a flow rate of the fluid flow.

16. A method comprising:
providing:
a metal pipe section;
a coil configured to receive a coil current and produce a magnetic field across the pipe section that induces an electromotive force (EMF) in a fluid flow traveling through an interior of the pipe section; and
a flow tube liner comprising a cylindrical wall formed by:
providing an electrically insulative interior layer of a non-metallic material; and
depositing a metallic exterior layer on an exterior surface of the interior layer; and
inserting the flow tube liner within the metal pipe section and bonding the metallic exterior layer to the metal pipe section.

17. The method of claim 16, wherein:
the interior layer comprises a polymer selected from the group consisting of fluoropolymer, perfluoroalkoxy alkane (PFA), polytetrafluoroethylene (PTFE), ethylene tetrafluoroethylene (ETFE), polyether ether ketone (PEEK), polycarbonate, polyethylene terephthalate (PET), acrylonitrile butadiene styrene (ABS), polycarbonate/acrylonitrile butadiene styrene (PC/ABS), polyetherimide (PEI), acrylic, nylon, crosslinked polyethylene (PEX) and polyoxymethylene (POM); and
the exterior layer comprises a metal selected from the group consisting of aluminum, stainless steel, gold, copper, titanium, chromium, tantalum, vanadium, nickel and a metallic oxide.

18. The method of claim 16, further comprising bonding an exterior surface of the exterior layer to an interior surface of the pipe section.

19. The method of claim 16, wherein:
the pipe section includes central axis;
the cylindrical wall of the flow tube liner is substantially concentric with the central axis and includes opposing ends that extend outside the pipe section; and
the method includes flaring the opposing ends of the flow tube liner to extend away from the central axis.

20. The method of claim 16, wherein:
the flow tube liner includes a first electrode aperture extending through the interior layer and the exterior layer, and a second electrode aperture extending through the interior layer and the exterior layer on an opposing side of the cylindrical wall from the first electrode aperture; and
the method comprises:
positioning a first electrode in a first tunnel extending through the first electrode aperture and the pipe section, wherein the first electrode is exposed to the interior of the pipe section; and positioning a second electrode in a second tunnel extending through the second electrode aperture and the pipe section, wherein the second electrode is exposed to the interior of the pipe section.

\* \* \* \* \*